United States Patent
Chevalier et al.

(10) Patent No.: US 11,809,559 B2
(45) Date of Patent: Nov. 7, 2023

(54) INTRUSION RESILIENT APPLICATIONS

(71) Applicant: Hewlett-Packard Development Company, L.P., Spring, TX (US)

(72) Inventors: Ronny Chevalier, Meudon (FR); David Plaquin, Bristol (GB)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 401 days.

(21) Appl. No.: 17/047,034

(22) PCT Filed: Jul. 30, 2019

(86) PCT No.: PCT/US2019/044223
§ 371 (c)(1),
(2) Date: Oct. 12, 2020

(87) PCT Pub. No.: WO2020/028419
PCT Pub. Date: Feb. 6, 2020

(65) Prior Publication Data
US 2021/0157918 A1    May 27, 2021

(51) Int. Cl.
| | |
|---|---|
| *G06F 21/56* | (2013.01) |
| *G06F 21/54* | (2013.01) |
| *G06F 21/55* | (2013.01) |
| *G06F 11/14* | (2006.01) |
| *G06F 11/30* | (2006.01) |

(52) U.S. Cl.
CPC .......... *G06F 21/566* (2013.01); *G06F 21/54* (2013.01); *G06F 21/554* (2013.01); *G06F 11/1438* (2013.01); *G06F 11/302* (2013.01); *G06F 11/3055* (2013.01); *G06F 2201/86* (2013.01); *G06F 2201/865* (2013.01)

(58) Field of Classification Search
CPC ...... G06F 21/566; G06F 21/54; G06F 21/554; G06F 11/1438; G06F 11/302; G06F 11/3055; G06F 2201/86; G06F 2201/865
See application file for complete search history.

(56) References Cited

U.S. PATENT DOCUMENTS

| | | | |
|---|---|---|---|
| 7,565,382 B1 * | 7/2009 | Sobel | ..................... G06F 21/74 |
| 7,784,098 B1 | 8/2010 | Fan | |
| 7,904,959 B2 * | 3/2011 | Sidiroglou | ............ G06F 21/554 |
| | | | 726/22 |

(Continued)

OTHER PUBLICATIONS

Oliner, Adam J., et al. "Cooperative checkpointing: A robust approach to large-scale systems reliability." In Proceedings of the 20th annual international conference on Supercomputing, pp. 14-23. 2006.

*Primary Examiner* — Christopher A Revak
(74) *Attorney, Agent, or Firm* — Knobbe, Martens, Olson & Bear, LLP

(57) ABSTRACT

In an example there is provided a method for receiving notification of an intrusion event in relation to an application from an intrusion detection system, accessing state data in relation to a state of the application prior to the intrusion event, the state data having been stored on the basis of a change of state of the application, accessing a policy to be applied to the state data in response to the intrusion event, modifying the state data on the basis of the policy, and restoring the application on the basis of the modified state data.

15 Claims, 3 Drawing Sheets

(56) References Cited

U.S. PATENT DOCUMENTS

| | | | |
|---|---|---|---|
| 8,935,789 B2 | 1/2015 | Shukla | |
| 9,363,286 B2 * | 6/2016 | Golovanov | H04L 63/1475 |
| 9,740,562 B2 | 8/2017 | Leibman | |
| 9,817,739 B1 | 11/2017 | Pise | |
| 11,216,559 B1 * | 1/2022 | Gu | G06F 21/564 |
| 2006/0168473 A1 | 7/2006 | Sahoo | |
| 2006/0195751 A1 | 8/2006 | Hess | |
| 2006/0242707 A1 | 10/2006 | Tang | |
| 2007/0174912 A1 | 7/2007 | Kraemer | |
| 2009/0125755 A1 | 5/2009 | Herscovitz | |
| 2011/0078497 A1 | 3/2011 | Lyne | |
| 2014/0156784 A1 | 6/2014 | Buck | |
| 2015/0261624 A1 | 9/2015 | Locasto et al. | |
| 2016/0070912 A1 | 3/2016 | Goel | |
| 2017/0364452 A1 * | 12/2017 | Okhravi | G06F 11/1048 |
| 2018/0336350 A1 * | 11/2018 | Lin | G06F 21/51 |
| 2019/0188380 A1 * | 6/2019 | Animireddygari | G06F 11/1469 |
| 2019/0286821 A1 * | 9/2019 | Strogov | G06F 21/568 |
| 2019/0392147 A1 * | 12/2019 | Gezalov | G06F 21/554 |
| 2021/0089400 A1 * | 3/2021 | Kashani | G06F 11/1492 |
| 2022/0309081 A1 * | 9/2022 | Singh | G06F 16/288 |

* cited by examiner

INTRUSION RESILIENT APPLICATIONS

BACKGROUND

Applications on computing systems are susceptible to being targeted by malicious software. Successful attacks can be highly disruptive for individuals and businesses. Intrusion detection systems may be deployed to identify malicious attacks against applications. Intrusion recovery systems provide rollback mechanisms that return the operating system or applications to a previous state. These systems restart applications from known safe states. In some cases, intrusion recovery systems periodically checkpoint states of the operating system or applications by saving state data to a secure location.

BRIEF DESCRIPTION OF THE DRAWINGS

Various features of certain examples will be apparent from the detailed description which follows, taken in conjunction with the accompanying drawings, which together illustrate, by way of example only, a number of features, wherein.

DETAILED DESCRIPTION

Figure 1:
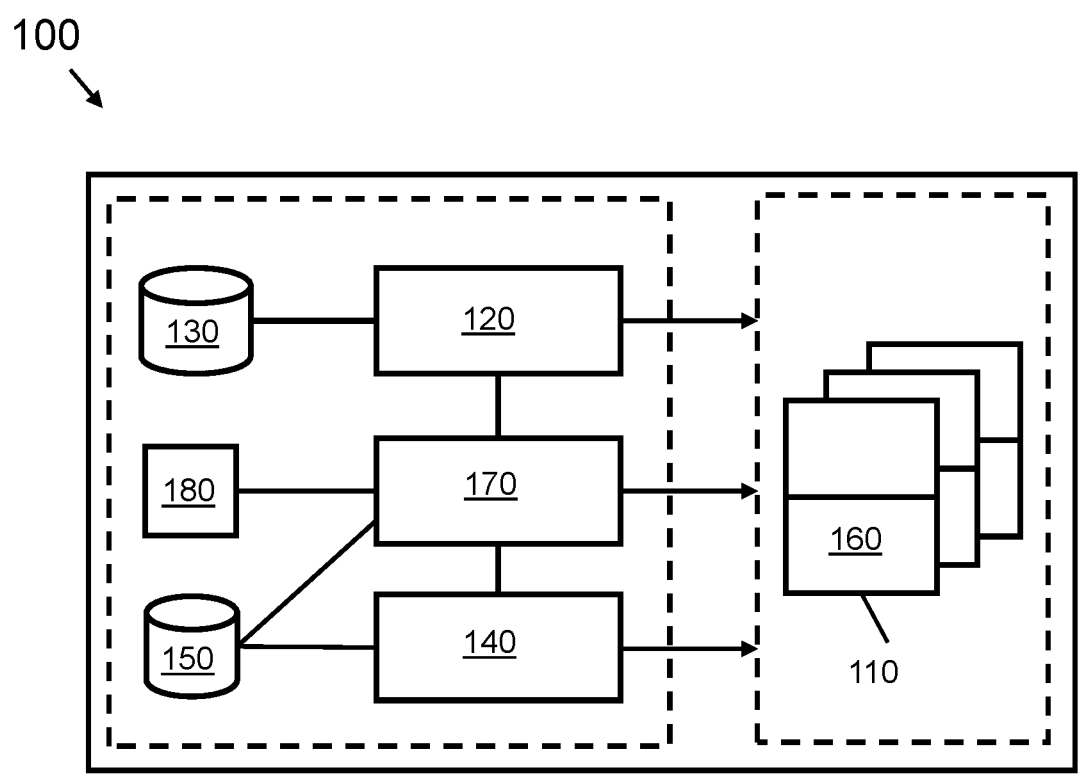
FIG. 1 is a block diagram of a computing system according to an example.

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

It is of growing concern to individuals and business to ensure that the processes and applications executing on their computing system are well protected against malicious attacks. Intrusion events are deliberate malicious attacks that are mounted against applications. Intrusion events are highly disruptive for businesses and organizations. Pinpointing the source of disruption caused by an intrusion event and patching the system against intrusion events can be costly and time consuming.

Systems can be secured against malicious intrusions using intrusion detection and recovery systems. Intrusion detection systems (IDS) are arranged to monitor applications and identify anomalous application behaviour. IDS may be implemented internally within applications. For example, application instructions may be instrumented to perform behaviour checks using stack cookies, or control flow integrity monitoring. In other examples, an IDS can be external to an application. For example, certain IDSs can implement anti-virus systems or perform certain behavioural checks on an application during execution. In such cases, the IDS is arranged to notify the computing system in the event of a detection of an intrusion event. The IDS itself does not perform any recovery of the application following an intrusion event.

In contrast to intrusion detection systems, intrusion recovery systems provide abilities to recover a computing system or application following an intrusion event. Certain examples of intrusion recovery systems implement so-called checkpointing. Checkpointing effectively creates save points for the state of the system or applications at particular time points. At a later stage the intrusion recovery system can recover the state of the system or applications using a roll-back mechanism, which reloads a previous saved state from secure storage, from a checkpoint prior to the intrusion event. Once the saved state is recovered, the intrusion recovery system can restart the computing system or applications and the saved state.

A full recovery of the whole operating system to a prior state can remove trace of malicious software on the system once the previous state is reloaded. However, intrusion recover systems which checkpoint the full state of the operating system, or which keep track of all the changes to the overall state between checkpoints incur heavy overheads. In particular, since the state of the whole operating system should be recoverable, a large amount of state data is used every time a checkpoint is created.

Other intrusion recovery systems employ non-cooperative checkpointing methods that freeze applications periodically. These approaches still incur significant overheads in terms of storage and CPU usage and can also affect business continuity due to the down time of the applications in question.

Furthermore, a system can still be re-infected by an attacker exploiting the same vulnerability. These systems also still enable attackers to achieve their goals such as data theft, integrity violation or propagation of an attack.

Certain methods and systems described herein according to examples provide a way of securing a computing system using a cooperative approach to checkpointing between the application and the computing system. In contrast to intrusion recovery systems which employ periodic checkpointing, in a cooperative checkpointing intrusion recovery system applications include instructions to selectively enable transmission of state data for storage. In addition to cooperative checkpointing of state data, acquired state data can be modified before starting a recovery process. Such modifications can be geared to minimise or prevent future intrusions. In certain examples, modifications applied to state data comprise applying mitigation actions prior to restarting the application. The methods and systems described herein ensure resiliency of applications against repeat attacks as well as recovering the application to a safe state.

In the methods and systems described in examples herein, semantic information about an application is preserved as the recovery system has access to data structures specific to the application as opposed to the opaque content of the address space of the application.

Furthermore, the methods and systems described do not freeze the application. State data is sent to secure storage as and when the application undergoes a significant change of state. Determining where changes of state occur in the source code is known beforehand. It is not necessary to freeze the whole application.

The methods and systems described herein provide a way for an operating system to maintain a backup of applications' states. When an intrusion is detected, the system can restore an affected application by providing them with a recent safe state. Moreover, a state can be modified before restoring an application in order to dynamically adapt to the current threat. Future intrusions can therefore be avoided based on the characteristics of the intrusion event as determined by an intrusion detection system. In addition, taking mitigating actions such as modifying privileges or access to resources, allows finer-grained mitigations to be applied. For example, it is possible to change algorithms or protocols used in an application in order to thwart intrusions based on vulnerabilities specific to one implementation or protocol.

FIG. 1 shows a computing system 100, according to an example. The computing system 100 is, for example, a server, a desktop computer or a portable computer. The computing system 100 comprises monitored applications 110. The applications 110 are executed in the environment of the operating system that is running on the computing system 100. In FIG. 1, it is assumed that the applications 110 are executing on a single operating system, on a single computing system however, the methods and systems described herein may be implemented across a plurality of different computing systems, such as networked computing systems in communication with one another. In an example, the operating system within which the applications can be executed can reside in an execution environment, such as a virtual machine for example.

The computing system 100 comprises an intrusion detection system (IDS) 120. The IDS 120 is arranged to monitor the applications 110. In the example shown in FIG. 1 the IDS 120 is arranged to monitor the applications 110 for anomalous behaviour. In examples described herein, anomalous behaviour may comprise the applications 110 executing in an unexpected manner such as making unexpected requests for data, unexpectedly executing processes or executing unexpected processes.

In one example, the IDS 120 is implemented internally by instrumenting the application instructions to perform behaviour checks. For example, the IDS 120 may be implemented using stack cookies or control flow integrity monitoring. In a second example the IDS is external to the monitored application 110. For example, in one case the IDS is implemented by giving more privileged access to the IDS to introspect the behaviour of the applications 110. In an example, the IDS can execute within a (trusted) container in a virtualised system.

In the event that anomalous behaviour is detected, the IDS 120 is arranged to notify the computing system 100. In the example of FIG. 1, the IDS 120 is communicatively coupled to a database 130. The database 130 is maintained by the IDS 120. Characteristic information about threats and/or malware is contained on the database 130. For example, in one case, the IDS 120 maintains signatures of malware which are stored on the database 130. In the event of detection of anomalous application behaviour, the IDS 120 can execute a malware scan on the application 110. In the event that potential malware is detected on the computing system 100 the IDS 120 uses the database of signatures to identify the type of malware. This information can be used later to determine an appropriate mitigation action for the application 110. In other examples, heuristic approaches can be used to determine information about the nature of the intrusion event on the application 110. Once the intrusion event is detected a notification is generated, along with information identifying the intrusion event.

The computing system 100, shown in FIG. 1 further comprises a state storage component 140. The state storage component 140 is arranged to store state data corresponding to the respective states of applications 110 during execution. In the example of FIG. 1, the state storage component 140 is communicatively coupled to a state storage database 150 which stores states in a protected format such that the integrity of the state data is preserved. When state data is communicated from the application 110 the state storage component 140 uploads the state data to the state storage database 150.

In an example, during normal operation, monitored applications 110 send current state data to the state storage component 140 using a state uploading component 160 that can form part of the application in question. That is, in an example, the state uploading component 160 can be part of the application logic and may be activated every time a significant change to the state of the application 110 is detected. In an example, the significance of a change of state is determined by the structure of the application instructions. According to one example, the state uploading component 160 can be manually implemented in the application 110.

In another example, the logic of the state uploading component 160 can be automatically generated via an additional compilation step. The additional compilation step can comprise instrumenting instructions of the application 110 in a manner that generates the state data automatically and sends it to a similar interface. In this case, the generation of the logic can use static analysis of the application 110 instruction to determine the state changes which are to be considered significant. In an example, a state data update can be sent each time such a state is modified. In other examples, a mix of both approaches involving manual and automatic analysis can be used.

The computing system 100 shown in FIG. 1 comprises a state restoration component 170. In the example of FIG. 1, the state restoration component 170 is communicatively coupled to the IDS 120, state storage component 140 and state storage database 150. The state restoration component 170 restores the state of the application in response to an intrusion event detected by the IDS 120.

When the IDS 120 detects an intrusion event in one of the applications 110, the IDS 120 communicates a notification of the intrusion event to the state restoration component 170. The state restoration component 170 receives the notification and, in response to receipt of notification, accesses state data corresponding to a state of the application 110 prior to the intrusion event. In an example, the state restoration component can apply mitigation actions to the state.

According to examples described herein, such mitigation actions can include (but are not limited to): disabling features of the application; preventing access to data utilised by the application 110; disabling processes executed by the application 110; and enabling additional safety checks in the application 110.

In some cases, the IDS can also communicate information relating to or representing characteristics of the intrusion event stored in the database 130. In this case, the mitigation actions can be based on the characteristics of the intrusion event. In the example shown in FIG. 1, there is shown a threat mitigation policy 180. The threat mitigation policy 180 specifies how to adapt the state of the application 110 in response to different intrusion events.

According to an example, the state restoration component 170 is arranged to access a threat mitigation policy 180. The state restoration component 170 is arranged to decide, based on characteristics of the intrusion event which mitigation actions to apply, then follow the actions described in the threat mitigation policy 180 to apply the particular mitigation actions. For instance, in certain examples, the state restoration component 170 can modify the application's 110 configuration to disable features that have vulnerabilities that can be exploited by a threat detected by the IDS. In another example, certain application optimization features can be disabled and an extra safety check mode enabled. For instance, if an intrusion exploits a script or macro engine in the application 110 to perform a malicious action, the threat mitigation policy 180 may specify that such an engine should be disabled in response to the intrusion event. In some examples, the threat mitigation policy 180 is provided as meta-data of the application which describes the actions to take in order to apply a specific mitigation action. This can be provided by a developer, for example.

Once the state restoration component 170 has accessed the state data and applied mitigation actions according to the threat mitigation policy 180, the state restoration component 170 restarts the application 110 using the stored state data.

Figure 2:
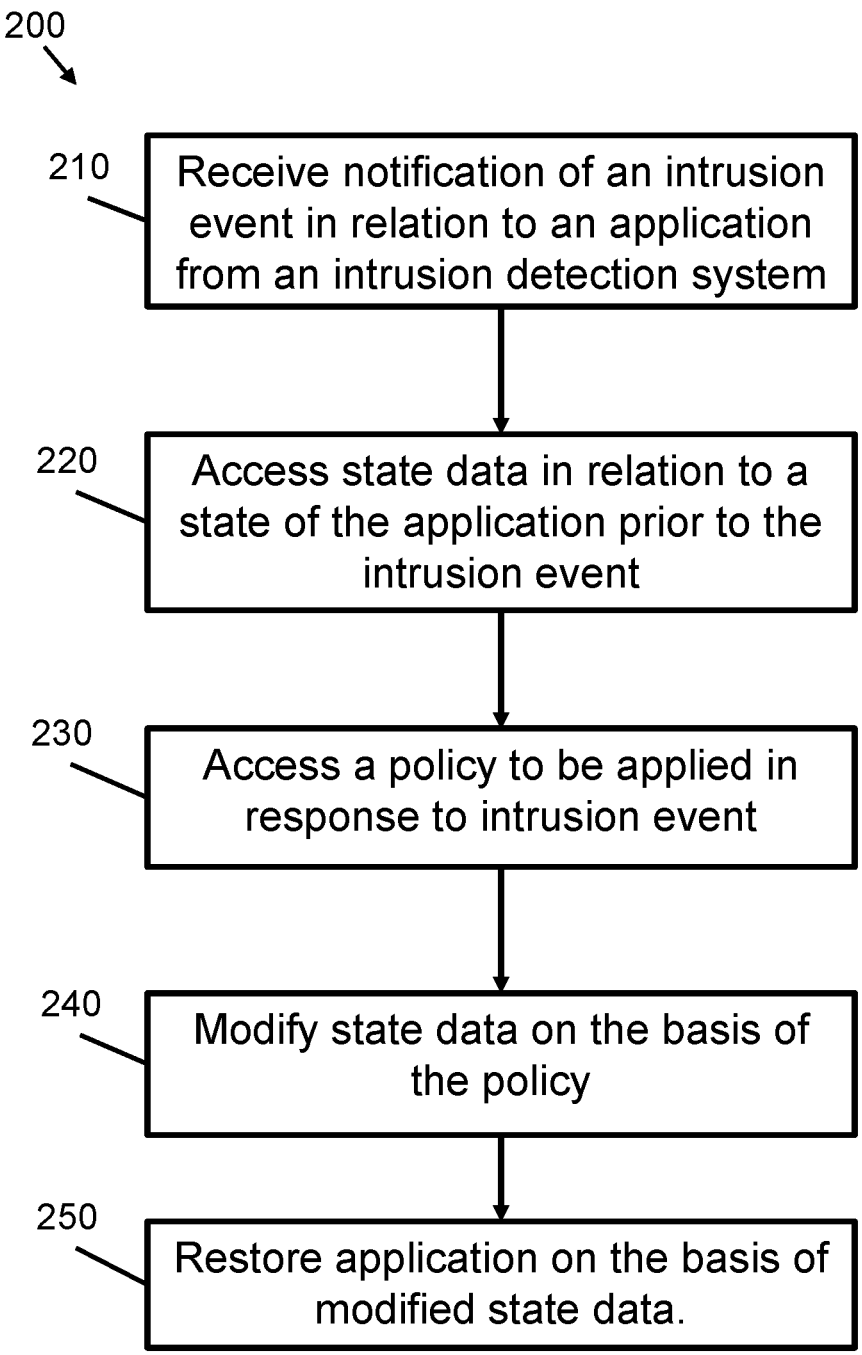
FIG. 2 shows a flow chart for restoring an application on a computing system, according to an example.

FIG. 2 is a flow diagram showing a method 200 of restoring an application according to an example. The method 200 may be implemented on the computing system 100 shown in FIG. 1. At block 210, a notification of an intrusion event in relation to an application is received from an intrusion detection system. When the method 200 is implemented on the computing system 100 shown in FIG. 1 the notification is received at the state restoration component 170.

At block 220 state data is accessed in relation to a state of the application prior to the intrusion event. This is implemented, for example, by the state restoration component 170 when the method 200 is implemented on the computing system 100. State data comprises data that corresponds to a whole or a part of a state of an application.

As described herein, the state data may be stored in a secure state data storage container such as state data storage 150. According to examples described herein the method 200 further comprises determining a change of state of the application and storing state data in response to the change of state of the application. In a further example, the method 200 comprises ceasing storage of state data in response to receipt of a notification of an intrusion event. In some cases, the changes of state of the application are determined from evaluating the source code of the application.

At block 230, a policy to be applied to the state data is accessed in response to an intrusion event. According to an example, block 230 is implemented by the state restoration component 170 shown in FIG. 1. In certain examples, modifying the state data on the basis of the policy comprises applying mitigation actions to the application in response to an intrusion event. In particular, the policy may specify actions such as disabling features of the application to execute a mitigation action in response to an intrusion event.

According to examples described herein, the method 200 further comprises receiving data specifying characteristics of the intrusion event. In examples, characteristics of an intrusion event comprise the nature and type of the intrusion event. For example, in the case of malware, the characteristics may specify how the application has been attacked in the case of known malware. In examples described herein, the mitigation actions to be applied to the application are determined on the basis of the characteristics of the intrusion event.

At block 240, the state data is modified on the basis of the policy. Modifying the state data may comprise, disabling features of the application, preventing access to data utilised by the application, disabling processes executed by the application and enabling additional safety checks in the application.

At block 250 the application is restored on the basis of the modified state data. According to examples, the state restoration component 170 shown in FIG. 1 implements this by communicating the modified state data to the application which is then reloaded by the operating system of computing system 100.

The methods and systems described herein prevent provides a way for an operating system (OS) to be resilient against intrusions by storing a backup of the state of its applications using a cooperative approach. The methods and systems described herein allow applications to send their current state to a protected storage and to restore themselves after an intrusion has been detected using a previous safe state. Such state data can be altered before restoration in order to adapt the application to the current threat and to avoid future intrusions.

In contrast to intrusion recovery systems, the methods and system described herein utilise cooperation from the monitored applications to send their current state, based on significant changes of state of the application instead of a periodic checkpointing. The methods and systems alter the state of an application before recovery to apply mitigations (e.g., change an implementation of a protocol) and to provide intrusion resiliency. In particular, these methods provide a more efficient way to store applications states and allows for finer-grained mitigations.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. In some examples, some blocks of the flow diagrams may not be necessary and/or additional blocks may be added. It shall be understood that each flow and/or block in the flow charts and/or block diagrams, as well as combinations of the flows and/or diagrams in the flow charts and/or block diagrams can be realized by machine readable instructions.

The machine-readable instructions may, for example, be executed by a general-purpose computer, a special purpose computer, an embedded processor or processors of other programmable data processing devices to realize the functions described in the description and diagrams. In particular, a processor or processing apparatus may execute the machine-readable instructions. Thus, modules of apparatus may be implemented by a processor executing machine-readable instructions stored in a memory, or a processor operating in accordance with instructions embedded in logic circuitry. The term 'processor' is to be interpreted broadly to include a CPU, processing unit, ASIC, logic unit, or programmable gate set etc. The methods and modules may all be performed by a single processor or divided amongst several processors.

Such machine-readable instructions may also be stored in a computer readable storage that can guide the computer or other programmable data processing devices to operate in a specific mode.

For example, the instructions may be provided on a non-transitory computer readable storage medium encoded with instructions, executable by a processor.

Figure 3:
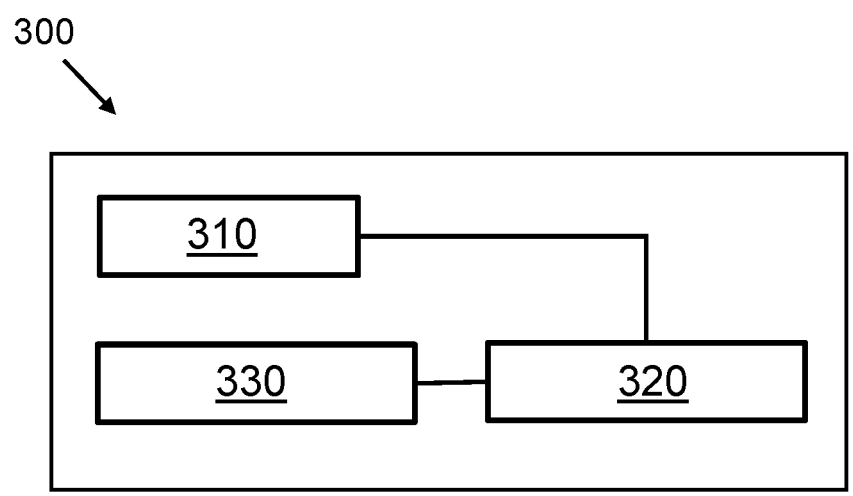
FIG. 3 shows a processor associated with a memory and comprising instructions for restoring an application, according to an example.

FIG. 3 shows an example of a computing system 300 for implementing the state restoration component 170 shown in FIG. 1. The computing system 300 comprises a processor 310 associated with a memory 320. The memory 320 comprises computer readable instructions 330 which are executable by the processor 310. The instructions 330 comprise instruction to, receive a notification of an intrusion event relating to a process from an intrusion detection system, access state data corresponding to states of the process prior to the intrusion event, access a mitigation policy to be applied in response to the intrusion event, modify the state data on the basis of the mitigation policy, and restore the process on the basis of the modified state data.

Such machine-readable instructions may also be loaded onto a computer or other programmable data processing devices, so that the computer or other programmable data processing devices perform a series of operations to produce computer-implemented processing, thus the instructions executed on the computer or other programmable devices provide an operation for realizing functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. In particular, a feature or block from one example may be combined with or substituted by a feature/block of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
    receiving notification of an intrusion event in relation to an application from an intrusion detection system;
    accessing state data in relation to a state of the application prior to the intrusion event, the state data having been stored on the basis of a change of state of the application;
    accessing a policy to be applied to the state data in response to the intrusion event;
    modifying the state data on the basis of the policy to minimize future intrusions; and
    restoring the application on the basis of the modified state data.

2. The method of claim 1, wherein modifying the state data on the basis of the policy comprises applying mitigation actions to the application in response to an intrusion event.

3. The method of claim 2, comprising receiving data specifying characteristics of the intrusion event.

4. The method of claim 3, wherein the mitigation actions to be applied to the application are determined on the basis of the characteristics of the intrusion event.

5. The method of claim 2, wherein mitigation actions comprise: disabling features of the application, preventing access to data utilised by the application, disabling processes executed by the application and enabling additional safety checks in the application.

6. The method of claim 1 comprising:
    determining a change of state of the application; and
    storing state data in response to the change of state of the application.

7. The method of claim 6, comprising, ceasing storage of state data in response to changes of state of the application, in response to receipt of notification of an intrusion event.

8. The method of claim 6, wherein changes of state of the application are determined on the basis of an evaluation of a source code of the application.

9. An apparatus for restoring an application executing on a computing system, the apparatus comprising:
    a state data storage arranged to store state data in cooperation with the application, on the basis of changes of states of the application during execution;
    an intrusion detection system arranged to monitor the application for anomalous activity; and
    a state restoration component communicatively coupled to the intrusion detection system and state data storage, arranged to:
        receive notification of an intrusion event from the intrusion detection system;
        access state data corresponding to a state of the application prior to the intrusion event;
        apply mitigation actions to the state data to minimize future intrusions; and
        restore the application on the basis of the state data and mitigation actions.

10. The apparatus of claim 9, wherein the state restoration component is arranged to access a threat mitigation policy specifying mitigation actions to apply based on characteristics of the intrusion event.

11. The apparatus of claim 9, wherein the intrusion detection system is arranged to perform: control flow integrity monitoring, anti-virus scanning, execution of stack cookies.

12. The apparatus of claim 9, comprising a state uploading component, arranged to:
    determine a change of state of the application; and
    communicate state data to the state data storage in response to the change of state of the application.

13. The apparatus of claim 9, wherein the state restoration component is arranged to prevent processing of state data subsequent to a detection of an intrusion event.

14. The apparatus of claim 12, wherein the state uploading component is implemented as an application programming interface in conjunction with the application.

15. A non-transitory machine-readable storage medium encoded with instructions executable by a processor, to:
    detect an intrusion event relating to a process;
    determine state data corresponding to previous states of the process prior to the intrusion event;
    generate modified state data by applying mitigation actions in response to the intrusion event to minimize future intrusions; and
    restore the process on the basis of the modified state data.

* * * * *